April 13, 1943.                L. TRAGER                    2,316,492
                              FLUID METER
                        Filed Aug. 26, 1941              2 Sheets-Sheet 1

Leon Trager
INVENTOR
BY
ATTORNEY

April 13, 1943.  L. TRAGER  2,316,492
FLUID METER
Filed Aug. 26, 1941  2 Sheets-Sheet 2

Leon Trager
INVENTOR
BY
ATTORNEY

Patented Apr. 13, 1943

2,316,492

UNITED STATES PATENT OFFICE 2,316,492

FLUID METER

Leon Trager, Newark, N. J., assignor to Worthington-Gamon Meter Company, Newark, N. J., a corporation of New Jersey Application August 26, 1941, Serial No. 408,322

5 Claims. (Cl. 73—233)

This invention relates to meters for measuring the flow of liquids and more particularly to a mechanism whereby any inaccuracies in the gear train of the meter may be compensated for and a high degree of accuracy provided for in the registering of the quantity of liquid measured by the meter.

In liquid measuring meters of the wobble-disc or piston type, the liquid is measured by movement of the piston and is registered on the indicator through a chain of gears operated by movement of the wobble-disc. Inaccuracies in registering the quantities of liquid passing through or measured by the meters often occurs due to wear on the gears of the gear train or to minor irregularities in the manufacture of the gears. An object of the present invention is to provide a meter structure embodying adjustable means for compensating for such irregularities or registering inaccuracies, which means is constructed and arranged to provide an infinite number of adjustments, thereby permitting a high degree of fineness in the adjustment and consequently a high degree of accuracy in the meter's operation.

With these and other objects in view, as may appear from the accompanying specification, the invention consists of various features of construction and combination of parts, which will be first described in connection with the accompanying drawings, showing a meter of the preferred form embodying the invention, and the features forming the invention will be specifically pointed out in the claims.

Figure 1:
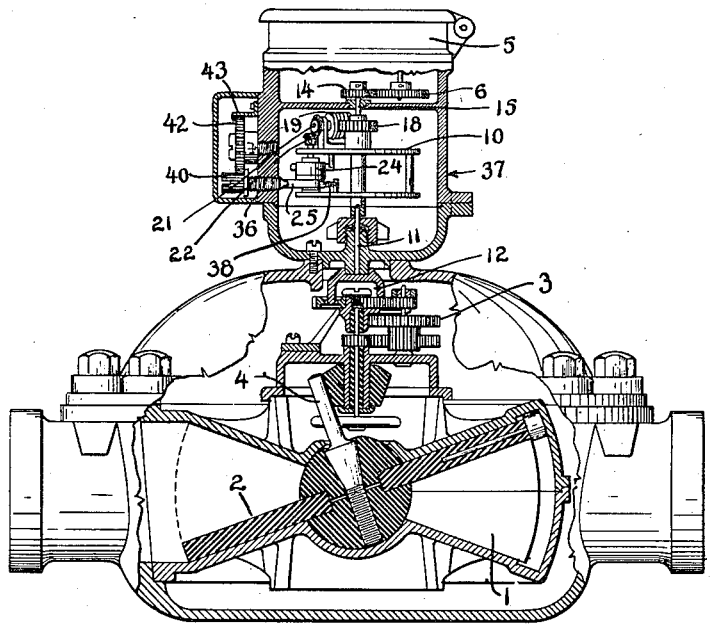
Figure 1 is a vertical sectional view through the improved meter.
Figure 2:
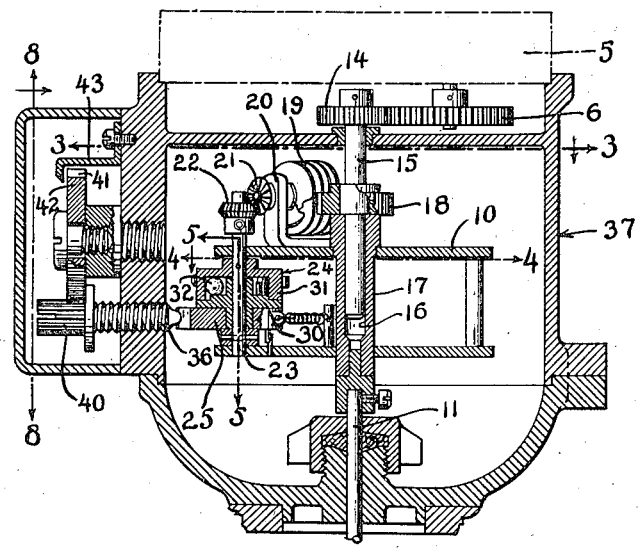
Figure 2 is an enlarged vertical sectional view through the compensating mechanism.

Referring more particularly to the drawings, the meter shown is of the general approved wobble-disc type embodying the cylinder 1 through which the liquid to be measured passes. As the liquid flows through the cylinder 1 it operates the wobble-disc or piston 2 in the usual manner. Movement of the piston 2 is transmitted to the gear train 3 by the usual movement transmission structure indicated at 4. The gear train 3, in the usual approved constructions of meters of this type, transmits the movement to a register of approved construction, which is indicated at 5, and includes a gear train 6.

The present invention embodies an inaccuracy compensating mechanism placed between the gear train 3 and the gear train 6 of the register 5. This compensating mechanism includes a transmission carrier 10, which is mounted upon a shaft 11 for rotation with the shaft. The shaft 11 is connected by the coupling 12 to the gear train 3. The gear 14 of the register gear train 6 is mounted upon a shaft 15, which extends into the bore 16 of the enlarged portion 17 of the shaft assembly, which carries the transmission carrier 10. The shaft 15 is rotatably mounted in the bore 16, and has a worm gear 18 mounted thereon which meshes with a worm 19. The worm 19 is rotatably carried by a bracket 20, which is in turn rigidly mounted upon or carried by the transmission carrier 10. The worm 19, meshing with the gear 18, holds the shaft 15 stationary relative to the carrier 10 and shaft assembly 17, so that movement will be transmitted from the gear train 3 through the shaft 11, carrier 10 and shaft 15 to the gear 14 of the gear train 6 for operating the register 5 and registering the quantity of liquid flowing through the meter.

The worm gear 19 is rotatably carried by the bracket 20, and it has a bevel gear 21 connected thereto which meshes with a bevel gear 22 pinned upon the shaft 23. The shaft 23 is rotatably carried by the transmission carrier 10 and has a slip clutch structure 24 mounted thereon for rotation therewith.

A cam 25 is mounted upon a sleeve 26 formed on the slip clutch 24, and one limit of movement of the cam 25 is defined by means of pins 27 and 28 carried by the transmission carrier 10 and the cam 25, respectively. The slip clutch structure 24 comprises the section 30, which is connected to the cam 25 for movement therewith, and the shell 31, which latter is connected to the shaft 23 for movement therewith. A clutch ball 32 is mounted within the shell 31 between the sleeve 33 formed on the member 30 and the inner wall of the shell 31, which ball is tensioned by a spring 34, and normally rests in the notch or recess 35 formed in the inner wall of the shell 31. The spring 34 is tensioned to urge the ball 32 in a counter-clockwise direction and place a restricted tension against its movement in a counter-clockwise direction.

Figure 3:
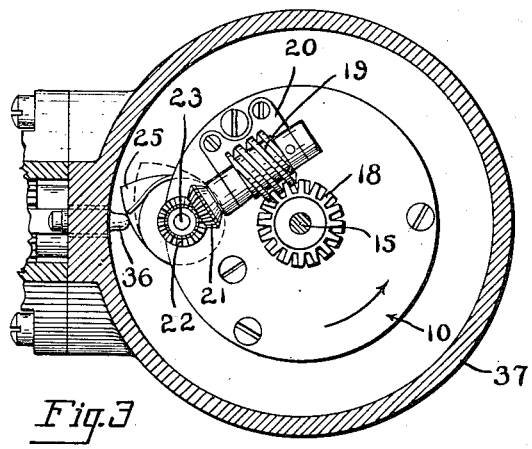
Figure 3 is a horizontal section taken on the line 3—3 of Fig. 2.
Figure 4:
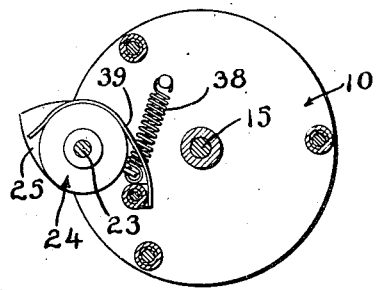
Figure 4 is a horizontal section taken on the line 4—4 of Fig. 2.
Figure 5:
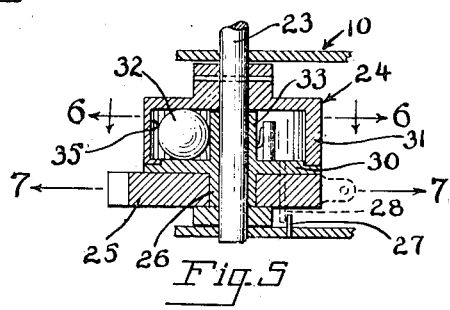
Figure 5 is an enlarged vertical section taken on the line 5—5 of Fig. 2.
Figure 6:
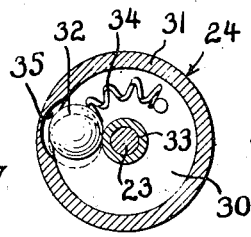
Figure 6 is a horizontal section taken on the line 6—6 of Fig. 5.
Figure 7:
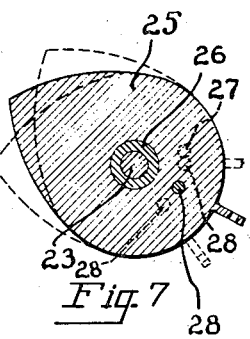
Figure 7 is a horizontal section taken on the line 7—7 of Fig. 5.
Figure 8:
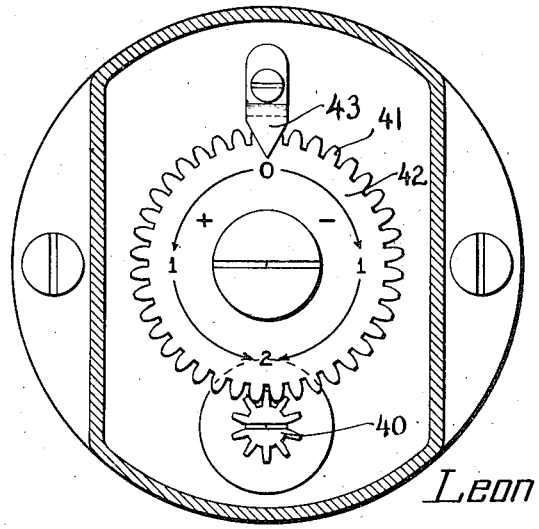
Figure 8 is a fragmentary vertical sectional view, enlarged, taken on the line 8—8 of Figure 2.

The cam 25 is, as clearly shown in Figures 3, 4 and 7 of the drawings, provided with a pointed portion projecting beyond the perimeter of the slip clutch 24 and presenting an arcuate surface for engagement with the inner end of an adjustable pin 36. The pin 36 is adjustably carried by the housing 37 and is stationary relative to the transmission carrier 10 and its companion parts, so that as the transmission carrier 10 rotates under movement imparted thereto by the gear train 3, the point of the cam 25 will engage and ride over the inner end of the adjustable pin 36, causing a rotation of the cam 25 and a resultant rotation of the section 30 of the slip clutch 24, and also of the shell section 31 thereof, as well as the shaft 23, owing to the fact that the ball 32 will be urged into clutching engagement with the shell 31 and the sleeve 33. The clutched rotation of the shell 31 and shaft 23 will rotate the worm gear 19, through the bevel gears 22 and 21, and in consequence thereof the gear 18 and the gear 14 of the gear train 6 will be rotated a fraction of a complete rotation, in a direction reverse of the normal direction of rotation thereof, thus providing compensating movement upon each complete rotation of the transmission carrier 10 for correcting inaccuracies in the gear train and providing accurate registering of the quantity of liquid passing through the meter.

After the cam 25 has passed over the inner end of the pin 36, it is returned to its original position by means of a spring 38, but during such return movement of the cam the shell 31 and consequently the shaft 23 are prevented from similar reverse movement owing to the fact that upon such return movement of the cam 25 and section 30, the ball 32 will move back into the recess 35, permitting return movement of the cam 25 and section 30 to their original position without imparting any movement to the shaft 15. Any slight reverse slippage of the shell 31 is prevented by means of a brake spring 39 which engages it. The pins 27 and 28 form stops for preventing the spring 38 from moving the cam 25 beyond its normal, proper position.

By adjustment of the pin 36 the degree of compensating movement of the gear 14 may be varied or regulated to provide proper correction of inaccuracies in registering the quantity of liquid metered.

The pin 36 has a toothed head 40 thereon which projects exteriorly of the housing 37 and meshes with the peripheral teeth 41 of the indicator disc 42, which latter cooperates with a pointer 43 for indicating the degree of adjustment of the pin 36 and consequently indicating the degree of the compensating movement of the shaft 15 provided by the movement of the cam 25.

By the provision of the slip clutch structure 24 it will be apparent that an infinite degree of adjustment or movement of the cam may be provided, permitting the maximum accuracy in compensating operation of the compensating mechanism.

It will be understood that the invention is not to be limited to the specific construction or arrangement of parts shown, but that they may be widely modified within the invention defined by the claims.

What is claimed is:

1. In a meter including a measuring piston, a registering mechanism and a gear train for transmitting measuring movement of the piston to the registering mechanism, means connecting the gear train and registering mechanism and constructed and arranged for correcting inaccuracies in the measurement registering movement of the registering mechanism, said means including a transmission carrier connected to the gear train for rotation thereby and connected to the registering mechanism to impart movement thereto, a cam carried by said transmission carrier for limited movement relative to the carrier, a slip clutch associated with the cam for movement therewith in one direction only, and means connected to the clutch to impart movement from the clutch to the registering mechanism in a direction reverse of the movement imparted to the registering mechanism from the transmission carrier.

2. In a meter including a measuring piston, a registering mechanism and a gear train for transmitting measuring movement of the piston to the registering mechanism, means connecting the gear train and registering mechanism and constructed and arranged for correcting inaccuracies in the measurement registering movement of the registering mechanism, said means including a transmission carrier connected to the gear train for rotation thereby and connected to the registering mechanism to impart movement thereto, a cam carried by said transmission carrier for limited movement relative to the carrier, a slip clutch associated with the cam for movement therewith in one direction only, means connected to the clutch to impart movement from the clutch to the registering mechanism in a direction reverse of the movement imparted to the registering mechanism from the transmission carrier, and adjustable means for regulating the degree of movement of the cam relative to the carrier.

3. In a meter including a measuring piston, a registering mechanism and a gear train for transmitting measuring movement of the piston to the registering mechanism, means connecting the gear train and registering mechanism and constructed and arranged for correcting inaccuracies in the measurement registering movement of the registering mechanism, said means including a transmission carrier connected to the gear train for rotation thereby and connected to the registering mechanism to impart movement thereto, a cam carried by said transmission carrier for limited movement relative to the carrier, a slip clutch associated with the cam for movement therewith in one direction only, means connected to the clutch to impart movement from the clutch to the registering mechanism in a direction reverse of the movement imparted to the registering mechanism from the transmission carrier, adjustable means for regulating the degree of movement of the cam relative to the carrier, and an indicator connected to and operated by said adjustable means for indicating the regulated degree of movement of the cam.

4. In a meter including a measuring piston, a registering mechanism and a gear train for transmitting measuring movement of the piston to the registering mechanism, means connecting the gear train and registering mechanism and constructed and arranged for correcting inaccuracies in the measurement registering movement of the registering mechanism, said means including a transmission carrier connected to the gear train for rotation thereby and connected to the registering mechanism to impart movement thereto, a cam carried by said transmission carrier for limited movement relative to the carrier, a slip clutch associated with the cam for movement therewith in one direction only, means connected to the clutch to impart movement from the clutch to the registering mechanism in a direction reverse of the movement imparted to the registering mechanism from the transmission carrier, and means for returning said cam to its original position after each movement thereof relative to the carrier, said slip clutch constructed and arranged to prevent movement of the clutch upon return movement of the cam.

5. In a meter including a measuring piston, a registering mechanism and a gear train for transmitting measurement movement of the piston to the registering mechanism, means connecting the gear train and registering mechanism and constructed and arranged for correcting inaccuracies in the measurement registering movement of the registering mechanism, said means including a transmission carrier connected to the gear train for rotation thereby and connected to the registering mechanism to impart movement thereto, a cam carried by said transmission carrier for limited movement relative to the carrier, a slip clutch associated with the cam for movement therewith in one direction only, means connected to the clutch to impart movement from the clutch to the registering mechanism in a direction reverse of the movement imparted to the registering mechanism from the transmission carrier, means for returning said cam to its original position after each movement thereof relative to the carrier, said slip clutch constructed and arranged to prevent movement of the clutch upon return movement of the cam, and adjustable means for regulating the degree of movement of the cam relative of the carrier.

LEON TRAGER.